(12) United States Patent
Kashiwagi et al.

(10) Patent No.: US 9,475,568 B2
(45) Date of Patent: Oct. 25, 2016

(54) COMPOSITE STRUCTURE, AIRCRAFT WING AND AIRCRAFT FUSELAGE INCLUDING COMPOSITE STRUCTURE, AND METHOD OF MANUFACTURING COMPOSITE STRUCTURE

(71) Applicant: MITSUBISHI HEAVY INDUSTRIES, LTD., Tokyo (JP)

(72) Inventors: Masahiro Kashiwagi, Tokyo (JP); Yoshinori Nonaka, Tokyo (JP); Toshio Abe, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 14/373,513

(22) PCT Filed: Feb. 14, 2013

(86) PCT No.: PCT/JP2013/053571
§ 371 (c)(1),
(2) Date: Jul. 21, 2014

(87) PCT Pub. No.: WO2013/129122
PCT Pub. Date: Sep. 6, 2013

(65) Prior Publication Data
US 2014/0377500 A1    Dec. 25, 2014

(30) Foreign Application Priority Data

Feb. 29, 2012   (JP) ................................. 2012-044757

(51) Int. Cl.
*B64C 1/00* (2006.01)
*B64C 1/14* (2006.01)
(Continued)

(52) U.S. Cl.
CPC .............. *B64C 1/1484* (2013.01); *B29C 70/30* (2013.01); *B64C 1/00* (2013.01); *B64C 3/00* (2013.01);
(Continued)

(58) Field of Classification Search
CPC ............. B64C 1/14; B64C 3/00; B64C 1/00; B64C 1/1484; B64C 3/20; B64C 2001/0072; B64C 3/34; B64F 5/00; B64F 5/0009; B29L 2031/3082; Y02T 50/433; Y10T 428/24273; Y10T 29/49801
USPC ......................................................... 428/131
See application file for complete search history.

(56) References Cited

U.S. PATENT DOCUMENTS

| | | |
|---|---|---|
| 5,452,867 A | 9/1995 | Grunwald et al. |
| 7,629,037 B2 | 12/2009 | Gaitonde |

(Continued)

FOREIGN PATENT DOCUMENTS

| | | |
|---|---|---|
| JP | 1-263030 | 10/1989 |
| JP | 4-89326 | 8/1992 |

(Continued)

OTHER PUBLICATIONS

International Search Report issued May 7, 2013 in International Application No. PCT/JP2013/053571.

(Continued)

*Primary Examiner* — Aaron Austin
*Assistant Examiner* — Michael Zhang
(74) *Attorney, Agent, or Firm* — Wenderoth, Lind & Ponack, L.L.P.

(57) ABSTRACT

A composite structure (3) formed of a composite member which extends in one direction, includes holes (5), and is made of fiber reinforced plastics. A tensile load and/or a compressive load are applied to the composite structure (3) in the one direction. Tensile stiffness and/or compression stiffness of peripheral areas (3a) of the holes (5) is lower than tensile stiffness and/or compression stiffness of the other area (3b), which surrounds the peripheral areas (3a), in the one direction, and the width of the peripheral area (3a) in a direction orthogonal to the one direction is set to 1.1 times or less of the diameter of the hole (5) in the direction orthogonal to the one direction.

8 Claims, 13 Drawing Sheets

(51) Int. Cl.
 B64C 3/00 (2006.01)
 B64F 5/00 (2006.01)
 B64C 3/20 (2006.01)
 B29C 70/30 (2006.01)
 B64C 3/34 (2006.01)
 B29L 31/30 (2006.01)

(52) U.S. Cl.
 CPC . B64C 3/20 (2013.01); B64F 5/00 (2013.01); B64F 5/0009 (2013.01); B29L 2031/3082 (2013.01); B64C 3/34 (2013.01); B64C 2001/0072 (2013.01); Y02T 50/433 (2013.01); Y10T 29/49801 (2015.01); Y10T 428/24273 (2015.01)

(56) References Cited

U.S. PATENT DOCUMENTS

| | | | |
|---|---|---|---|
| 2004/0161585 A1* | 8/2004 | Gaitonde | B64C 1/1446 428/131 |
| 2012/0121854 A1* | 5/2012 | Yoshida et al. | 428/137 |
| 2013/0243992 A1 | 9/2013 | Tanaka et al. | |

FOREIGN PATENT DOCUMENTS

| | | |
|---|---|---|
| JP | 6-191489 | 7/1994 |
| JP | 2002-302097 | 10/2002 |
| JP | 2003-513821 | 4/2003 |
| JP | 2012-162147 | 8/2012 |
| JP | 2012-162148 | 8/2012 |
| WO | 01/34381 | 5/2001 |
| WO | 03/022678 | 3/2003 |
| WO | 2011/043346 | 4/2011 |
| WO | WO 2011043346 A1 * | 4/2011 |
| WO | 2012/105691 | 8/2012 |

OTHER PUBLICATIONS

Written Opinion of the International Searching Authority issued May 7, 2013 in International Application No. PCT/JP2013/053571.
Extended European Search Report issued Oct. 30, 2015 in corresponding European Patent Application No. 13754443.3.
Decision of Patent Grant issued Aug. 9, 2016 in corresponding Japanese Patent Application No. 2012-044757 (with English translation).

* cited by examiner

FIG. 7

| ZONE A RANGE (XXa) | 0mm (−) | 16.25 (0.27a) | 32.50 (0.54a) | 48.75 (0.81a) | 60.00 (1.00a) | 65.00 (1.08a) |
|---|---|---|---|---|---|---|
| CIRCLE (b/a=1.8) | ZONE B | ZONE A | ZONE A | ZONE A | ZONE A | ZONE A |
| STRAIN CONCENTRATION RATE | 2.2 | 2.2 | 2.1 | 2.0 | 1.8 | 1.7 |
| STRAIN CONCENTRATION RATIO | (1.0) | (1.0) | (0.9) | (0.9) | (0.8) | (0.8) |
| ALLOWABLE STRAIN RATE | | | 1.0 | | | 0.97 |

FIG. 8

| ZONE A RANGE (XXa) | 70.00 (1.17a) | 80.00 (1.33a) | 90.00 (1.50a) | 100 (1.67a) |
|---|---|---|---|---|
| CIRCLE (b/a=1.8) | ZONE A | ZONE A | ZONE A | ZONE A |
| STRAIN CONCENTRATION RATE | 1.8 | 1.8 | 1.9 | 1.9 |
| STRAIN CONCENTRATION RATIO | (0.8) | (0.8) | (0.9) | (0.9) |
| ALLOWABLE STRAIN RATIO | 0.97 | | | |

FIG. 11

| ZONE A RANGE (XXa) | 0mm (–) | 16.25 (0.27a) | 32.50 (0.54a) | 48.75 (0.81a) | 60.00 (1.00a) | 65.00 (1.08a) |
|---|---|---|---|---|---|---|
| CIRCLE (b/a=1.0) | ZONE B, a, b, 90°, 0 | ZONE A | ZONE A | ZONE A | ZONE A | ZONE A |
| STRAIN CONCENTRATION RATE | 3.1 | 3.0 | 2.8 | 2.6 | 2.4 | 2.3 |
| STRAIN CONCENTRATION RATIO | (1.0) | (1.0) | (0.9) | (0.8) | (0.8) | (0.7) |
| ALLOWABLE STRAIN RATIO | | 1.0 | | | | 0.97 |

FIG. 12

| ZONE A RANGE (XXa) | 70.00 (1.17a) | 80.00 (1.33a) | 90.00 (1.50a) | 100 (1.67a) |
|---|---|---|---|---|
| CIRCLE (b/a=1.0) | ZONE A | ZONE A | ZONE A | ZONE A |
| STRAIN CONCENTRATION RATE | 2.4 | 2.5 | 2.5 | 2.5 |
| STRAIN CONCENTRATION RATIO | (0.8) | (0.8) | (0.8) | (0.8) |
| ALLOWABLE STRAIN RATIO | 0.97 | | | |

COMPOSITE STRUCTURE, AIRCRAFT WING AND AIRCRAFT FUSELAGE INCLUDING COMPOSITE STRUCTURE, AND METHOD OF MANUFACTURING COMPOSITE STRUCTURE

BACKGROUND OF INVENTION

1. Technical Field

The present invention relates to a composite structure, an aircraft wing and an aircraft fuselage including the composite structure, and a method of manufacturing the composite structure.

2. Background Art

In the areas of aircraft, ships, vehicles, and the like, a composite member made of fiber reinforced plastics (FRP) is widely used as a structure that has high strength and light weight. The composite member has advantages in terms of the fact that the composite member is "lighter and stronger" than metal.

Holes may be formed at this composite member for checking or access at the time of assembly. When holes are formed, strain concentration occurs in peripheral areas of the holes. Even though a strain-concentrated portion reaches fracture strain, metal is finally broken with plastic deformation without being instantly fractured. In a general design, for example, the static strength of a flat plate including holes is evaluated using net stress that is obtained by dividing a load by the cross-sectional area of the flat plate except for the holes. Meanwhile, since the plastic deformation of the composite member is less than the plastic deformation of metal, the sensitivity of the composite member to strain concentration (holes, notches) is high and a strain concentration rate needs to be also considered for the evaluation of the static strength of the composite member. As a result, since the thickness of a peripheral portion of the hole should be increased, advantages in terms of "light weight and high strength" are not achieved.

PTL 1 discloses a hole periphery reinforcing device for reducing a strain concentration rate, which is caused by holes, by providing a portion, which is made of a material having large elongation and low stiffness as compared to a base material, on the peripheral portion of the hole.

CITATION LIST

Patent Literature

[PTL 1] Japanese Unexamined Utility Model Registration Application Publication No. 4-89326 (Claim 1, paragraph (00121)

Technical Problem

When a material, which has low stiffness as compared to the base material, is provided on the peripheral portion of the holes as described in PTL 1, the strength of the peripheral portion of the hole is reduced accordingly. However, when a load is applied to the composite member, which includes the holes, in one direction, the peripheral edge of the hole is particularly likely to be fractured at positions of ±90° with respect to the one direction. For this reason, when the stiffness of the peripheral portion of the hole is set to be low, there is a demerit that the peripheral portion of the hole is more likely to be fractured.

SUMMARY OF INVENTION

The invention has been made in consideration of these circumstances, and an object of the invention is to provide a composite structure in which a strain concentration rate of a peripheral portion of a hole is reduced, fracture does not easily occur at a portion likely to be fractured, and weight can be reduced, an aircraft wing and an aircraft fuselage including the composite structure, and a method of manufacturing the composite structure.

Solution to Problem

In order to solve the problem, a composite structure of the invention, an aircraft wing and an aircraft fuselage including the composite structure, and a method of manufacturing the composite structure employ the following means.

That is, a composite structure according to a first aspect of the invention is formed of a composite member which extends in one direction, includes holes, and is made of fiber reinforced plastics. A tensile load and/or a compressive load is applied to the composite structure in the one direction. Tensile stiffness and/or compression stiffness of peripheral areas of the holes in the one direction is lower than tensile stiffness and/or compression stiffness of the other area, which surrounds the peripheral areas, in the one direction. The width of the peripheral area in a direction orthogonal to the one direction is set to 1.1 times or less of the diameter of the hole in the direction orthogonal to the one direction.

Since the tensile stiffness of the peripheral areas of the holes in the one direction is lower than the tensile stiffness of the other area, which surrounds the peripheral areas of the holes, in the one direction, the other area mainly bears the tensile load. Accordingly, since a tensile load applied to the peripheral areas of the holes becomes relatively small, a strain concentration rate applied to the peripheral areas of the holes is reduced. Therefore, it is possible to reduce the reinforcement of the peripheral areas of the holes as compared to a case in which the peripheral areas of the holes are formed to have the same tensile stiffness as the tensile stiffness of the other area.

Further, when the compression stiffness of the peripheral areas of the holes in the one direction is lower than the compression stiffness of the other area, which surrounds the peripheral areas of the holes, in the one direction, the other area mainly bears the compressive load. Accordingly, since a compressive load applied to the peripheral areas of the holes becomes relatively small, a strain concentration rate applied to the peripheral areas of the holes is reduced. Therefore, it is possible to reduce the reinforcement of the peripheral areas of the holes as compared to a case in which the peripheral areas of the holes are formed to have the same compression stiffness as the compression stiffness of the other area.

Furthermore, when a tensile load and a compressive load are applied to a composite structure (that is, a bending load is applied), the tensile stiffness and the compression stiffness of the peripheral areas of the holes in the one direction may be set to be lower than the tensile stiffness and the compression stiffness of the other area in the one direction so that the other area mainly bears a tensile load and a compressive load.

When the peripheral areas are formed to have stiffness lower than the stiffness of the other area, the strength of the peripheral areas is also reduced accordingly. However, when the width of the peripheral areas is set to be equal to or smaller than the diameter of the hole, a portion likely to be fractured is excluded from the peripheral areas having low stiffness. As a result, the strength of the portion likely to be fractured becomes equal to the strength of the other area. That is, it is possible to reduce a strain concentration rate, which is applied to the peripheral areas of the holes, without reducing the strength of the portion likely to be fractured. Accordingly, a composite structure having high actual strength is obtained.

In the first aspect, the peripheral area may be formed of a composite member that includes a fiber oriented in a direction of ±30° to ±60° as a main component when the one direction is assumed as 0°.

In the first aspect, the peripheral area may be formed of a composite member that includes a fiber oriented in a direction of ±45° as a main component when the one direction is assumed as 0°.

Since the peripheral area includes a fiber oriented in a direction of ±30° to ±60°, preferably, in a direction of ±45° as a main component, tensile stiffness in the direction of 0° (one direction) is reduced. Accordingly, it is possible to realize an area that allows elongation in a tensile direction (and/or a compression direction). Further, since the peripheral area includes a fiber provided in a direction of ±30° to ±60°, preferably, in a direction of ±45° as a main component, strength in a shear direction (a direction orthogonal to the one direction, that is, directions of ±90°) is increased. Accordingly, it is possible to increase torsional stiffness.

Meanwhile, "includes a fiber oriented in a direction of ±30° to ±60° as a main component" and "includes a fiber oriented in a direction of ±45° as a main component" mean that a blending ratio of a fiber oriented in a direction of ±30° to ±60° or a direction of ±45° is larger than that of a composite member generally used (that is, the other area). For example, a general composite member, which is used as a main wing of an aircraft, has a blending ratio of a fiber oriented in a direction of ±45° that is about 60% ((0°, +45°, −45, 90°)=(30%, 30%, 30%, 10%)), but means a blending ratio larger than this, for example, 70% or more, preferably, 80% or more.

Further, in order to further reduce the stiffness of the peripheral area in the direction of 0°, it is preferable that a fiber oriented in the direction of 0° be made of a material having stiffness lower than the stiffness of a fiber oriented in a direction of ±30° to ±60°, preferably, a direction of ±45°. For example, when a carbon fiber is used in a direction of ±30° to ±60°, preferably, a direction of ±45°, a glass fiber or an aramid fiber is used in the direction of 0°.

In the first aspect, the holes may be access holes that are formed at a lower outer plate of a wing of an aircraft.

The lower outer plate forms a lower surface portion of a torque box that bears a load applied to a main wing of an aircraft. Accordingly, a tensile load is applied to the lower outer plate in the longitudinal direction of the main wing during flight. Since predetermined areas of peripheral edges of the access holes are the peripheral areas and an area surrounding the peripheral areas is the other area, the other area mainly bears a tensile load and only a relatively small tensile load is applied to the peripheral areas. Accordingly, since it is possible to reduce the reinforcement of the peripheral areas of the access holes, it is possible to provide a main wing of which the weight has been reduced.

In the first aspect, the holes may be window holes that are formed at an outer plate of a fuselage of an aircraft.

A tensile load and a compressive load (that is, a bending load) are applied to the fuselage of the aircraft in the longitudinal direction. Since predetermined areas of peripheral edges of the window holes are the peripheral areas and an area surrounding the peripheral areas is the other area, the other area mainly bears a tensile load and a compressive load and only a relatively small tensile load and a relatively small compressive load are applied to the peripheral areas. Accordingly, since it is possible to reduce the reinforcement of the peripheral areas of the window holes, it is possible to provide a fuselage for an aircraft of which the weight has been reduced.

Further, a second aspect of the invention provides a method of designing a composite structure formed of a composite member which extends in one direction, includes holes, and is made of fiber reinforced plastics. A tensile load and/or a compressive load is applied to the composite structure in the one direction. The method includes: setting tensile stiffness and/or compression stiffness of peripheral areas of the holes in the one direction to tensile stiffness and/or compression stiffness that is lower than the tensile stiffness and/or the compression stiffness of the other area, which surrounds the peripheral areas, in the one direction; and calculating a strength ratio from allowable strain and a strain concentration rate of each of the peripheral areas and the other area, and setting widths of the peripheral areas in a direction orthogonal to the one direction on the basis of the strength ratio.

Furthermore, a third aspect of the invention provides a method of manufacturing a composite structure formed of a composite member which extends in one direction, includes holes, and is made of fiber reinforced plastics. A tensile load and/or a compressive load is applied to the composite structure in the one direction. The method includes: setting tensile stiffness and/or compression stiffness of peripheral areas of the holes in the one direction to tensile stiffness and/or compression stiffness that is lower than the tensile stiffness and/or the compression stiffness of the other area, which surrounds the peripheral areas, in the one direction; and calculating a strength ratio from allowable strain and a strain concentration rate of each of the peripheral areas and the other area, and setting a width of the peripheral area in a direction orthogonal to the one direction to 1.1 times or less of the diameter of the hole on the basis of the strength ratio.

Since the tensile stiffness (and/or compression stiffness) of the peripheral areas of the holes in one direction is lower than the tensile stiffness (and/or compression stiffness) of the other area that surrounds the peripheral areas of the holes in the one direction, the other area mainly bears a tensile load (and/or a compressive load). Accordingly, since a tensile load (and/or a compressive load) applied to the peripheral areas of the holes is relatively small, a strain concentration rate applied to the peripheral areas of the holes is reduced. Therefore, it is possible to reduce the reinforcement of the peripheral areas of the holes as compared to a case in which the peripheral areas of the holes are formed to have the same tensile stiffness (and/or compression stiffness) as the tensile stiffness (and/or compression stiffness) of the other area.

It is possible to manufacture a composite structure, which achieves the reduction of a strain concentration rate applied to the peripheral areas and the strength of the composite member in balance, by setting the widths of the peripheral areas on the basis of a strength ratio.

In the third aspect, the peripheral area may be formed of a composite member that includes a fiber oriented in a direction of ±30° to ±60° as a main component when the one direction is assumed as 0°.

In the third aspect, the peripheral area may be formed of a composite member that includes a fiber oriented in a direction of ±45° as a main component when the one direction is assumed as 0°.

Advantageous Effects of Invention

According to a composite structure of the invention, an aircraft wing and the aircraft fuselage including the composite structure, and a method of manufacturing the composite structure, the tensile stiffness and/or the compression stiffness of the peripheral area is set to be lower than the tensile stiffness and/or the compression stiffness of the other area so that a strain concentration rate applied to the peripheral area of the hole is low, and the width of the peripheral area is set to 1.1 times or less of the diameter of the hole. Accordingly, it is possible to reduce the weight of the composite structure by simplifying the reinforcing structure of the peripheral area of the hole.

BRIEF DESCRIPTION OF DRAWINGS

FIG. 7 is a view showing the disposition of Zone A with respect to a hole of a first example and a width d of Zone A.

FIG. 8 is a view showing the disposition of Zone A with respect to the hole of the first example and the width d of Zone A.

FIG. 11 is a view showing the disposition of Zone A with respect to a hole of a second example and a width d of Zone A.

FIG. 12 is a view showing the disposition of Zone A with respect to a hole of the second example and a width d of Zone A.

DESCRIPTION OF EXAMPLES

An embodiment of the invention will be described below with reference to FIGS. 1 to 3.

Figure 1A:
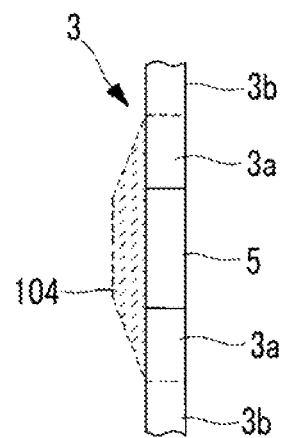
FIG. 1A is a plan view showing a lower outer plate of a main wing of an aircraft according to an embodiment of a composite structure of the invention.
Figure 1B:
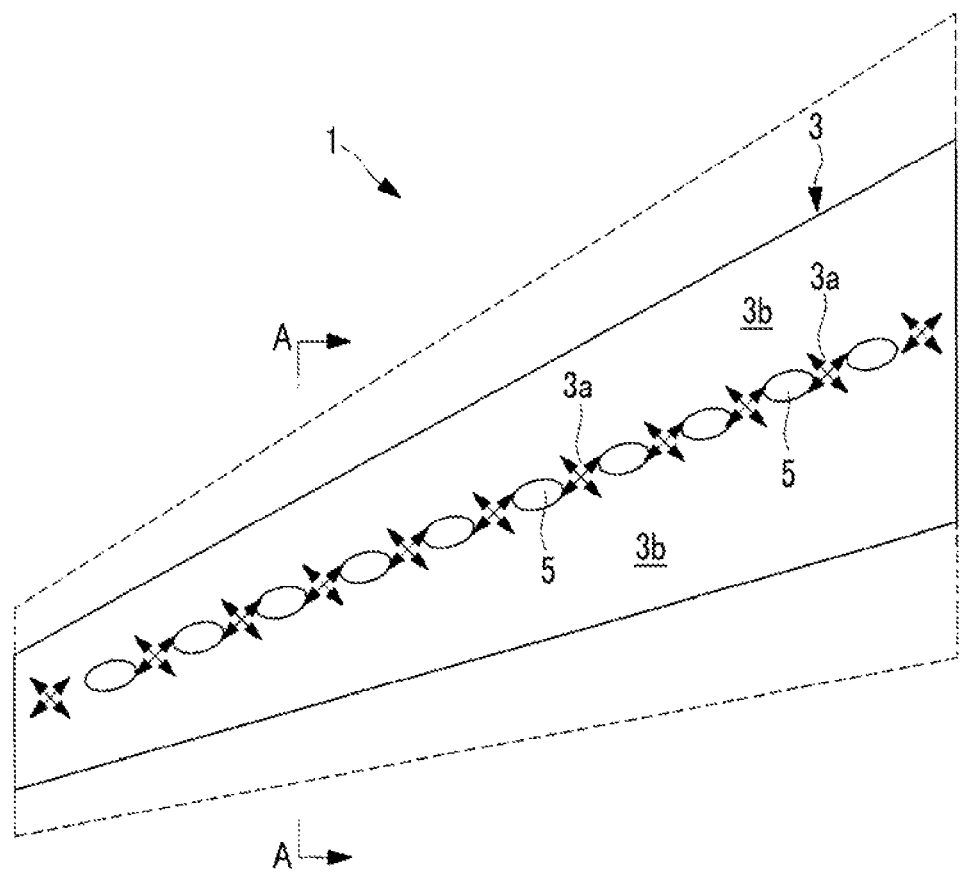
FIG. 1B is a longitudinal sectional view showing the lower outer plate of the main wing of the aircraft according to the embodiment of the composite structure of the invention and taken along line A-A of FIG. 1A.

A lower outer plate 3 of a main wing 1 of an aircraft is shown in FIG. 1A. The lower outer plate 3 is formed of a composite structure that is made of fiber reinforced plastics (FRP). A broken line shown in the drawings is a visible outline of the main wing 1 that includes a flap, a slat, or the like.

Figure 2:
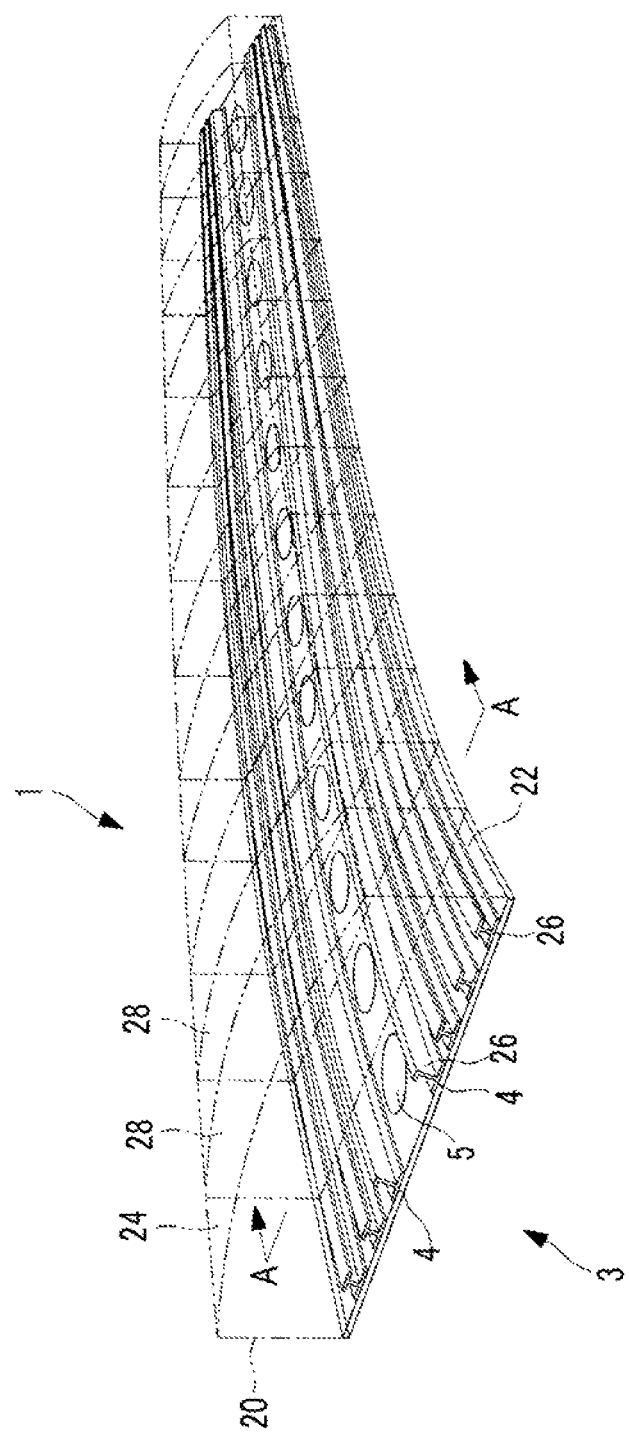
FIG. 2 is a perspective view showing the lower outer plate and stringers that form a part of the main wing having box structure.
Figure 3:
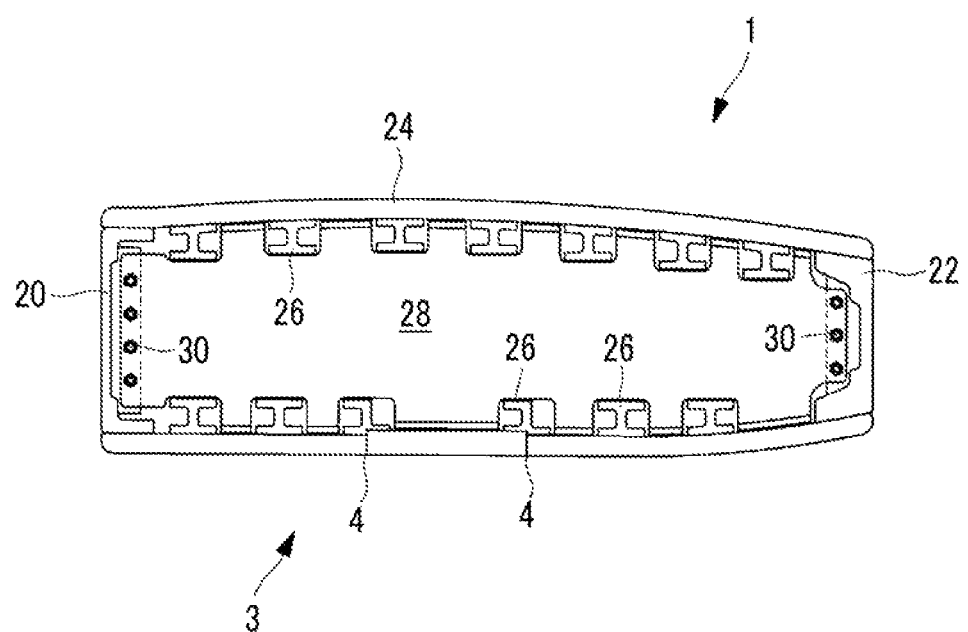
FIG. 3 is a cross-sectional view taken along line A-A of FIG. 2.

As shown in FIGS. 2 and 3, the lower outer plate 3 forms a box-like torque box together with a front spar 20 and a rear spar 22, which are formed of side outer plates erected from both ends of the lower outer plate 3 in a width direction, and an upper outer plate 24 that connects an upper end of the front spar 20 with an upper end of the rear spar 22. Accordingly, the lower outer plate 3 bears the load of the main wing 1.

A plurality of stringers 26 are provided in a longitudinal direction of the main wing 1. Like the lower outer plate 3 or the like, the stringer 26 is formed of a composite member made of FRP. Since the respective stringers 26 are fixed to the inner surfaces of the lower outer plate 3 and the upper outer plate 24, the respective stringers 26 mainly bear the load of the main wing 1 in the longitudinal direction.

Further, ribs 28 are provided in the main wing 1 having the box structure so as to divide the inner space of the main wing 1 into a plurality of spaces in the longitudinal direction. Each of the ribs 28 is formed in the shape of a plate that extends in a width direction of the main wing 1 (a direction orthogonal to the longitudinal direction), and the plurality of ribs 28 are disposed at a predetermined interval in the longitudinal direction. As shown in FIG. 3, front and rear end portions of each of the ribs 28 are fixed to the front and rear spars 20 and 22 by predetermined fasteners 30, such as bolts and nuts, respectively.

As shown in FIG. 1A, a plurality of access holes 5, which are used when a fuel tank provided in the main wing 1 is checked, assembled, or the like, are formed in the lower outer plate 3 at a predetermined interval in an extending direction of the main wing 1.

The lower outer plate 3 includes peripheral areas 3a that are positioned around the respective access holes 5 and the other area 3b that surrounds the peripheral areas 3a. The lower outer plate 3 is formed of an integrated composite member. Meanwhile, in FIG. 1B, the peripheral area 3a is represented by two arrows crossing each other. The arrows crossing each other represent a reinforced composite fiber having a blending ratio having ±45° as a main component as described below.

The peripheral areas 3a are formed on both sides of an axis, which is a line parallel to the extending direction of the main wing 1 and passes through the centers of the respective access holes 5, so as to have a predetermined width. Here, the "width" means the length of the peripheral area in the direction orthogonal to the extending direction of the main wing 1. A width d of the peripheral area 3a is set to 1.1 times or less of the diameter of the access hole 5 in the direction orthogonal to the extending direction.

The width d of the peripheral area 3a is set on the basis of a strength ratio. The "strength ratio" is calculated from allowable strain, which is calculated from allowable stress and an elastic modulus of each of the peripheral areas and the other area, and a strain concentration rate. The allowable stress and the elastic modulus can be obtained from a ratio between a 0°-layer and a ±30°-layer to a ±60°-layer (for example, ±45°-layer) that occupy the laminated structure of fiber sheets forming a composite member.

The other area 3b is positioned around the peripheral areas 3a, and is substantially present in the entire area except for the peripheral areas 3a.

The peripheral areas 3a and the other area 3b, which form the lower outer plate 3, are formed of composite members that include carbon fiber reinforced plastics (CFRP) as a main component. The number of the composite members to be laminated is determined according to load that is to be borne, and is set to, for example, about several tens.

A ratio of the orientation of the carbon fiber of the other area 3b is substantially set to a ratio that is generally used for the structure of an aircraft. For example, a plurality of sheets having the respective fiber directions are laminated so that "(0°, +45°, −45°, 90°)=(30%, 30%, 30%, 10%)" is satisfied when the extending direction of the main wing 1 (longitudinal direction) is assumed as 0°.

Unlike the case of the other area 3b, a ratio of the orientation of the carbon fiber of the peripheral area 3a has ±45° as a main component when the extending direction of the main wing 1 is assumed as 0°. That is, a plurality of sheets having the respective fiber directions are laminated so that the orientation ratio of ±45° of the peripheral area 3a is larger than that of the other area 3b and the orientation ratio of, for example, ±45° is 70% or more. In addition, a fiber in a direction of 0° may be changed to a glass fiber, an aramid fiber, or the like from a carbon fiber in order to reduce tensile stiffness in a direction of 0°.

Figure 4:
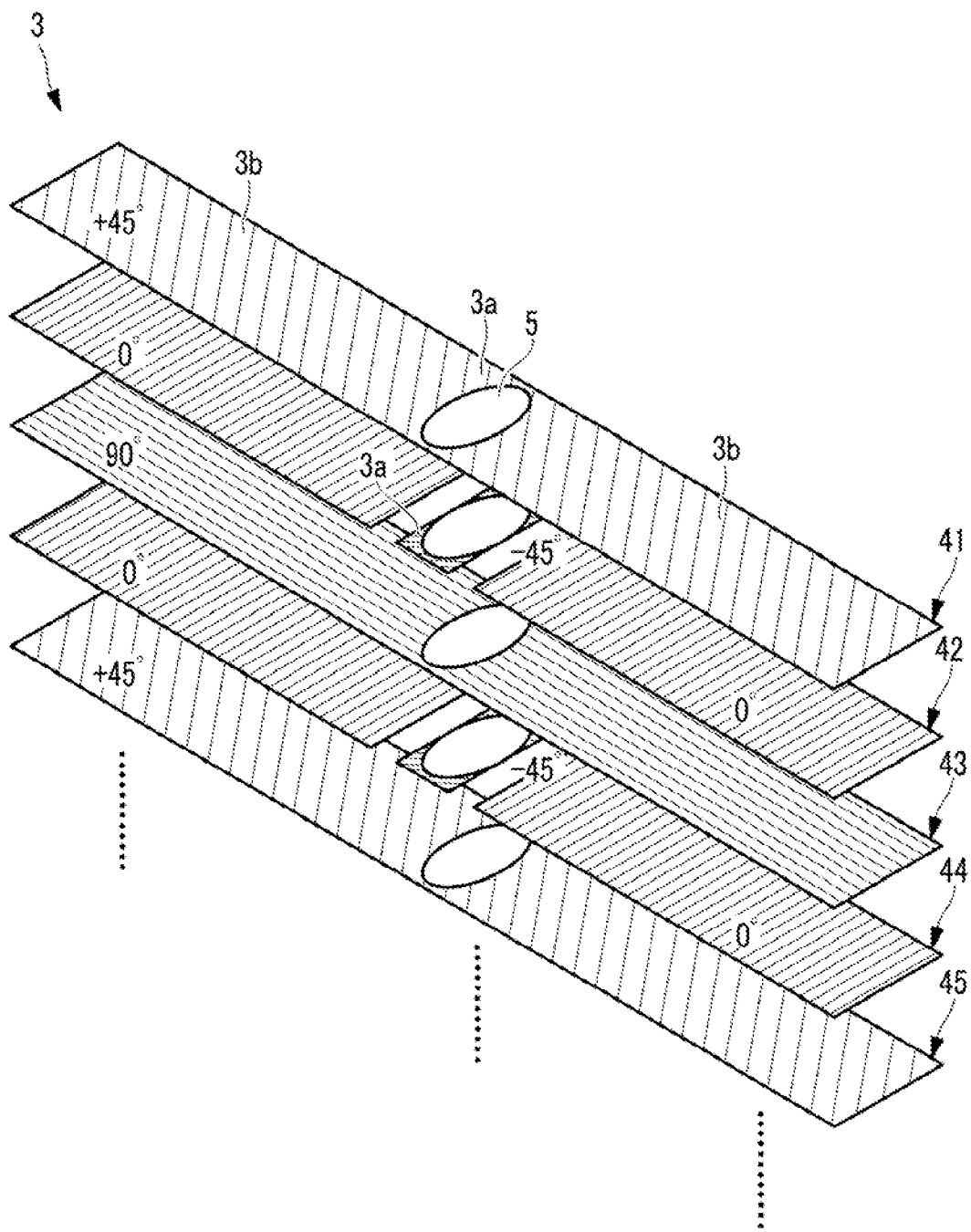
FIG. 4 is an exploded perspective view showing a method of laminating fiber sheets.

An example of the laminate structure of the fiber sheets of the lower outer plate 3, which realizes the above-mentioned blending ratio, is shown in FIG. 4.

For example, as shown in FIG. 4, a +45°-fiber sheet, which extends over the peripheral area 3a and the other areas 3b, is disposed on a first layer 41 that is positioned on the uppermost portion in FIG. 4. On a second layer 42 that is positioned below the first layer 41, a −45°-fiber sheet (peripheral area fiber sheet) is disposed in the peripheral area 3a, and a 0°-fiber sheet (the other area fiber sheet) is disposed in the other areas 3b positioned on both sides of the peripheral area 3a. A 90°-fiber sheet is disposed over the peripheral area 3a and the other areas 3b on a third layer 43 that is positioned below the second layer 42. On a fourth layer 44 that is positioned below the third layer 43, as in the second layer 42, a −45°-fiber sheet is disposed in the peripheral area 3a and a 0°-fiber sheet is disposed in the other areas 3b positioned on both sides of the peripheral area 3a. As in the first layer 41, a +45°-fiber sheet, which extends over the peripheral area 3a and the other areas 3b, is disposed on a fifth layer 45 that is positioned below fourth layer 44.

Figure 5:
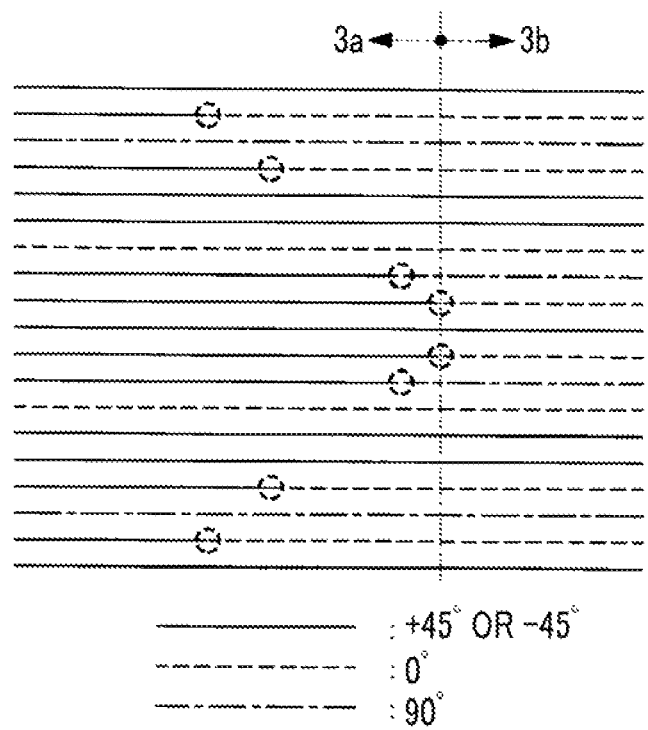
FIG. 5 is a cross-sectional view showing a method of laminating laminated sheets.

It is possible to make the peripheral area 3a have an orientation ratio of ±45° as a main component as compared to the other area 3b, by repeating the above-mentioned first to fifth layers 41 to 45 or by appropriately performing an arbitrary combination of these layers (see FIG. 5).

Splice positions are shown in FIG. 5 by broken-line circles. The splice position means a division position between the peripheral area fiber sheet and the other area fiber sheet. In FIG. 5, the splice positions are disposed so as to be distributed to positions that are shifted from each other in the extending direction of the fiber sheet when viewed in a laminating direction. When the splice positions are disposed so as to correspond to each other in the laminating direction, the division positions of the fiber sheets overlap each other in the laminating direction. As a result, the strength of a material at the positions is reduced. The reason for the distribution of the splice positions is to avoid the reduction of the strength of the material at the positions.

Next, effects, which are obtained when the main wing 1 having the above-mentioned structure is used, will be described.

During flight, a load is applied to the main wing 1 so that a tip of the main wing 1 is displaced upward. Accordingly, a tensile load is applied to the lower outer plate 3 of the main wing 1 in the extending direction of the main wing 1 (the direction of 0°). Not the peripheral area 3a but the other area 3b of the lower outer plate 3 mainly bears the tensile load in the direction of 0°. The reason for this is that the peripheral area 3a is formed of an area having low stiffness against the tensile load in the direction of 0° and the peripheral area 3a includes a fiber oriented by ±45° as a main component as compared to the other area 3b. Accordingly, since only a tensile load smaller than a load applied to the other area 3b is applied to the peripheral area 3a, the required strength of the peripheral area 3a is reduced. That is, a reinforcing laminated body for increasing the thickness does not need to be provided around the hole. For ease of understanding, a reinforcing laminated body 104 is shown together in FIG. 1A. Since the reinforcing laminated body 104 is not needed as described above, it is possible to reduce the weight by the weight of the reinforcing laminated body 104.

Further, since the peripheral area 3a includes ±45° as a main component, the peripheral area 3a is reinforced against stiffness in a shear direction, that is, torsional stiffness. Accordingly, the peripheral area 3a does not bear an axial force (tensile load) and bears a torsional load. Furthermore, since the width of the peripheral area 3a is equal to or smaller than the diameter of the access hole 5, the allowable strain of a portion where the access hole 5 is likely to be fractured is equal to that of the other area 3b.

In addition, since the peripheral area 3a and the other area 3b are formed of an integrated composite member, peeling does not occur.

Meanwhile, the application of the invention to the lower outer plate 3 of the main wing 1 has been described in this embodiment, but the invention is not limited thereto. The invention can be widely applied to a composite structure including holes.

For example, the same structure as the lower outer plate 3 may be applied to the upper outer plate that forms the torque box together with the lower outer plate 3. In this case, a compressive load is applied to the upper outer plate, but it is possible to reduce a strain concentration rate, which is applied to the peripheral area 3a, and to ensure the strength of a portion, which is likely to be fractured, by setting the compression stiffness of the peripheral area 3a to a stiffness that is lower than the compression stiffness of the other area 3b and setting the width of the peripheral area 3a to a width that is equal to or smaller than the diameter of the hole.

Further, this embodiment can also be applied to a tail assembly and the like.

Figure 6:
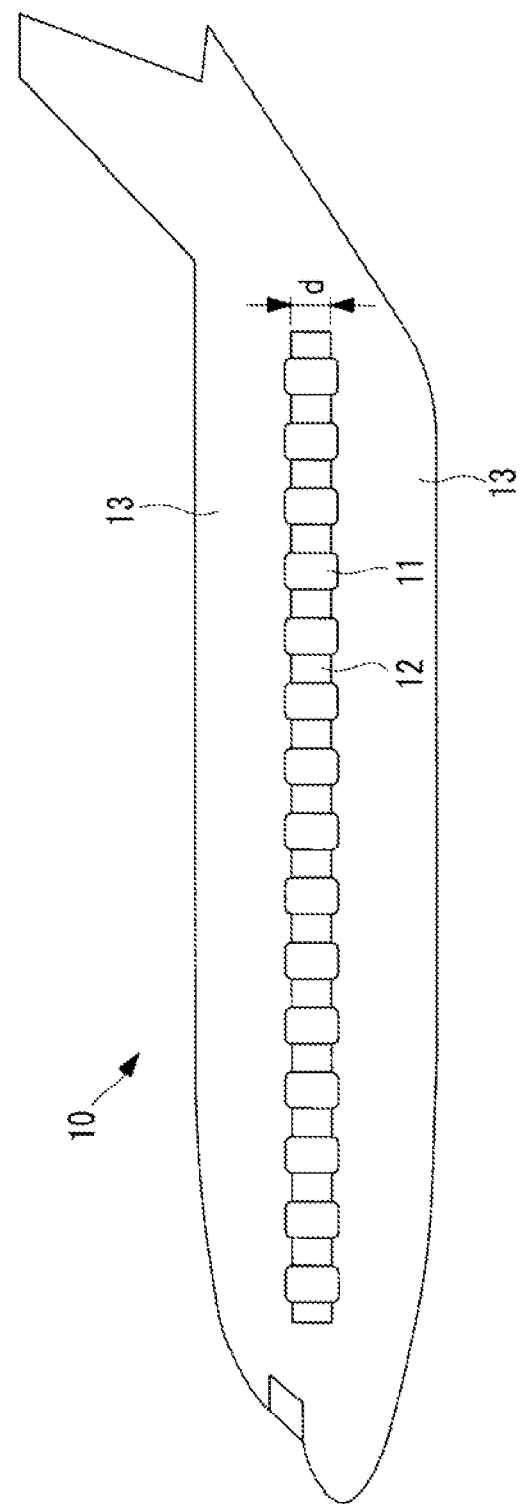
FIG. 6 is a side view showing another application example of the composite structure of the invention and showing a fuselage portion of an aircraft.

Furthermore, this embodiment can also be applied to an aircraft fuselage 10 where window holes 11 are formed as shown in FIG. 6. In this case, the same material as the material of the peripheral area 3a of the embodiment is applied to peripheral areas 12 of the window holes 11, and the same material as the material of the other area 3b of the embodiment is applied to the other area 13. A bending load (that is, a tensile load and a compressive load) is applied to the fuselage 10, but it is possible to reduce a strain concentration rate, which is applied to the peripheral area of the window hole 11, and to ensure the strength of a portion, which is likely to be fractured, by setting the tensile strength and the compression stiffness of the peripheral areas 12 to tensile strength and compression stiffness that are lower than the tensile strength and the compression stiffness of the other area, and setting a width d of the peripheral area 3a to a width that is equal to or smaller than the diameter of the hole.

In addition, the composite structure of the invention is not limited to an aircraft and can also be applied to, for example, a ship, a vehicle, and the like.

Further, carbon fiber reinforced plastic (CFRP) has mainly been used in the embodiment, but the invention is not limited thereto. For example, glass fiber reinforced plastic (GFRP) or aramid fiber reinforced plastic (AFRP) may be used.

Next, a method of setting the width d of the peripheral area is exemplified.

FIRST EXAMPLE

The width d of the optimum peripheral area of a composite structure having the following configuration was set.

The composite structure is made of CFRP including holes (thickness t: 6.1 mm, and width w: 400 mm), and includes peripheral areas (Zones A) and the other area (Zone B).

The peripheral area (Zone A) had a laminate structure in which a 0°-layer occupies 12.5% of the entirety and a 45°-layer occupies 75% of the entirety, and an elastic modulus of the peripheral area in the direction of 0° was 35 GPa (5076 ksi).

The other area (Zone B) had a laminate structure in which a 0°-layer occupies 37.5% of the entirety and a 45°-layer occupies 50% of the entirety, and an elastic modulus of the other area in the direction of 0° was 63 GPa (9137 ksi).

Holes, which were formed at the composite structure, were formed in the shape of an ellipse having a major diameter b and a minor diameter a. The major diameter b extended in the extending direction of a composite member (the direction of 0°), and the minor diameter extended in a direction orthogonal to the extending direction of the composite member (the direction of 90°).

The disposition of Zone A with respect to the hole and the width d of Zone A are shown in FIGS. 7 and 8. The width d of Zone A (a ratio relative to the minor diameter a) was set to 0 mm, 16.25 mm (0.27 times), 32.50 mm (0.54 times), 48.75 mm (0.81 times), 60.00 mm (1.00 time), 65.00 mm (1.08 times), 70.00 mm (1.1.7 times), 80.00 mm (1.33 times), 90.00 mm (1.50 times), and 100 mm (1.76 times).

Allowable Strain and Allowable Strain Ratio

Allowable strain of Zone A and Zone B was calculated from allowable stress and an elastic modulus. Allowable stress can be derived from a tensile test based on JIS K 7165. Further, an elastic modulus in the direction of 0° was acquired on the basis of JIS K 7165, and an elastic modulus of a laminated plate was set using a classical lamination theory.

Figure 9:
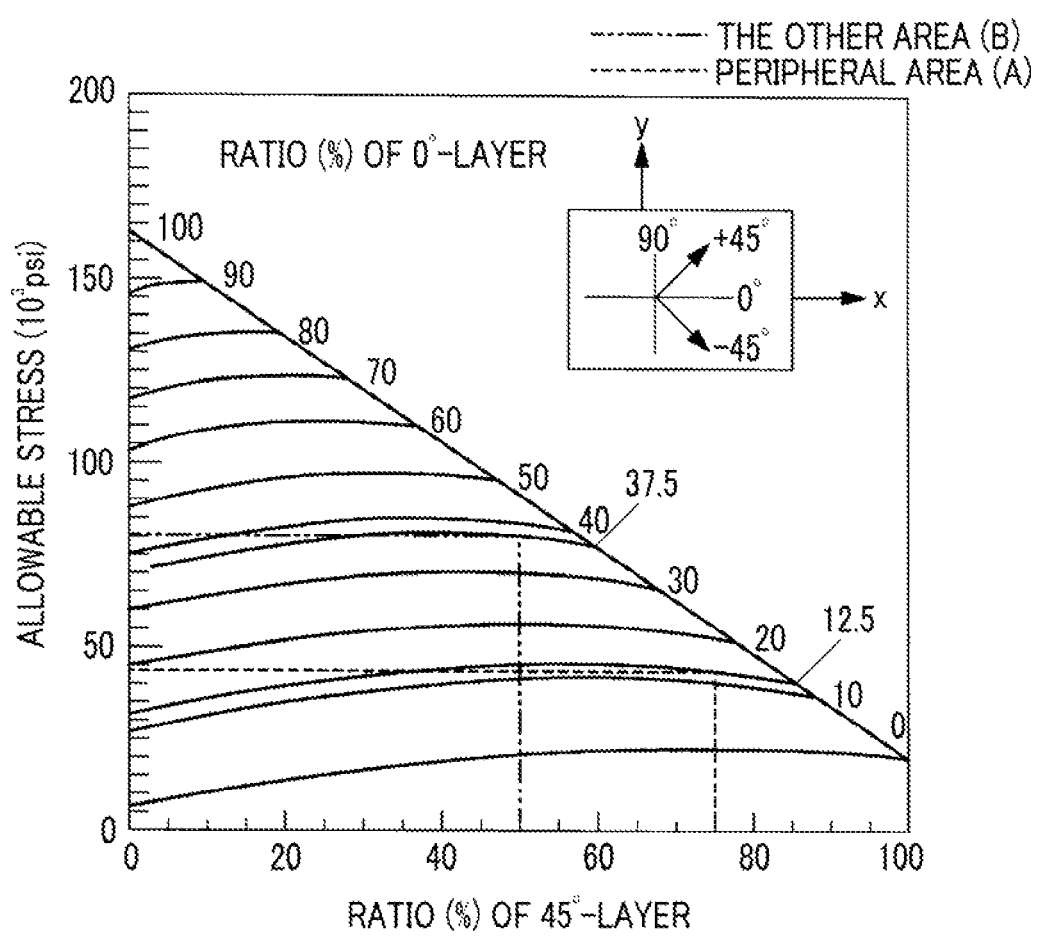
FIG. 9 is a graph showing a relationship between a ratio of a 45°-layer and allowable stress.

FIG. 9 is a graph showing a relationship between a ratio of a 45°-layer and allowable stress. In FIG. 9, a horizontal, axis represents a ratio of the 45°-layer, a vertical axis represents allowable stress, and a diagonal axis represents a ratio of a 0°-layer. Meanwhile, 1 psi was 0.006895 MPa.

According to FIG. 9, as for Zone A, allowable stress is about 43 ksi and allowable strain (=allowable stress/elastic modulus) was 8471 micro m/m. Further, as for Zone B, allowable stress is about 80 ksi and allowable strain (=allowable stress/elastic modulus) was 8756 micro m/m.

An allowable strain ratio was calculated with reference to the allowable strain of Zone B on the basis of the results. The "allowable strain ratio" is an index representing the allowable strain of a peripheral area of the hole that is adjacent to a portion where the minor diameter a intersects with the periphery of the hole. The allowable strain ratio was 1.0 when the width d of Zone A is equal to or smaller than the minor diameter a. The allowable strain ratio was 0.97 when the width d of Zone A is larger than the minor diameter a.

Strain Concentration Rate and Strain Concentration Ratio

A strain concentration rate at the width d of each Zone A, when tension was applied in the direction of 0°, was calculated by a finite element method (FEM) analysis.

Strain concentration rates, when the width d of Zone A was changed (width d: 0 mm, 16.25 mm, 32.50 mm, 48.75 mm, 60.00 mm, 65.00 mm, 70.00 mm, 80.00 mm, 90.00 mm, and 100 mm), were 2.2, 2.2, 2.1, 2.0, 1.8, 1.7, 1.8, 1.8, 1.9, and 1.9, respectively.

Strain concentration ratios were calculated on the basis of the results. The strain concentration ratio is a value that is obtained with reference to the strain concentration rate obtained when the width of Zone A is 0 mm, that is, when Zone A is not formed. The strain concentration ratios were 1.0, 1.0, 0.9, 0.9, 0.8, 0.8, 0.8, 0.8, 0.9, and 0.9, respectively.

Strength Ratio

Figure 10:
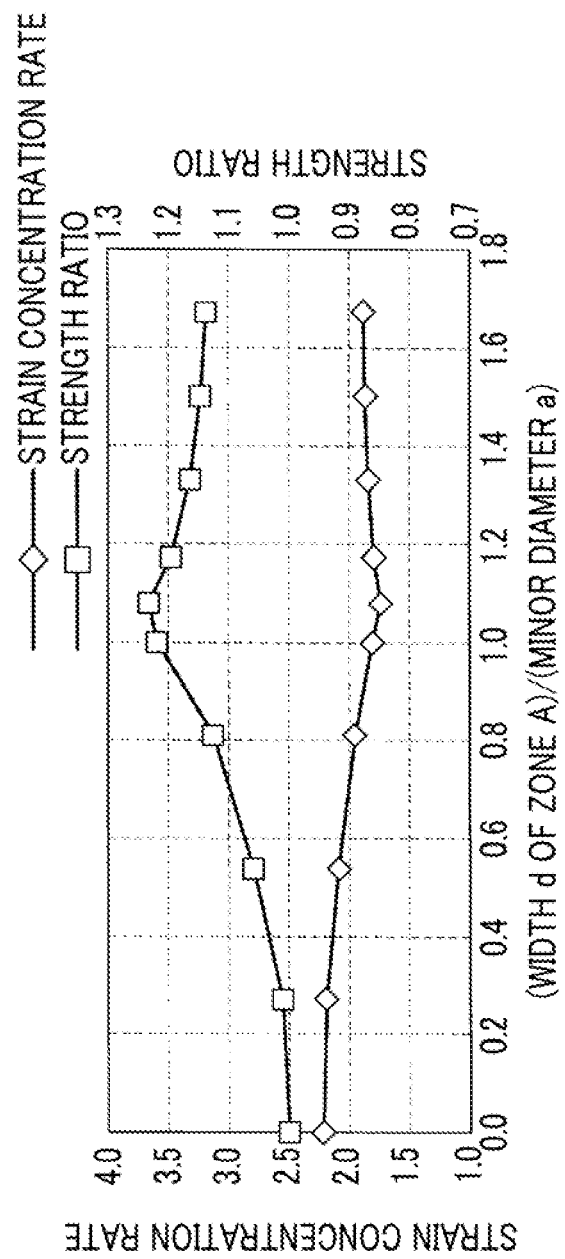
FIG. 10 is a graph showing a relationship between the width of Zone A of the first example and a strain concentration rate and a relationship between the width of Zone A and a strength ratio.

A strength ratio (=allowable strain ratio/strain concentration ratio) was calculated from an allowable strain ratio and a strain concentration ratio. FIG. 10 is a graph showing a relationship between the width of Zone A and a strain concentration rate, and a relationship between the width of Zone A and a strength ratio. In FIG. 10, a horizontal axis represents a ratio of the width d of the peripheral area A to the minor diameter a of the hole, a left vertical axis represents a strain concentration rate, and a right vertical axis represents a strength ratio.

According to FIG. 10, a strain concentration rate was minimum when the width of Zone A was 1.08 times of the minor diameter a of the hole. Accordingly, it was confirmed that an effect of reducing the strain concentration rate of the peripheral portion of the hole was obtained by setting the width d of Zone A to 0.54 times or more of the minor diameter a of the hole.

A strength ratio in the case in which Zone A is formed is higher than a strength ratio in the case in which Zone A is not formed. Accordingly, when the width of Zone A is set to 0.54 times or more of the minor diameter a of the hole, the effect becomes significant. When the width of Zone A was 1.08 times of the minor diameter a of the hole, the effect becomes maximum. In the examination, the increase of a strength ratio, which occurs when the width d of Zone A is set to 1.0 time or less of the minor diameter a of the hole, is caused by the fact that an area, which is adjacent to a portion where the minor diameter a of the hole intersects with the periphery of the hole, (a portion that is likely to be fractured) becomes the other area and the allowable strain ratio of a portion, which is likely to be fractured, is increased.

When the width d of Zone A having low stiffness is increased, the stiffness of the entire composite structure is reduced. Accordingly, it is preferable that the width d of Zone A be as small as possible to obtain an effect of reducing a strain concentration rate to the maximum and to prevent the deterioration of the function of the composite structure. Further, since Zone A (low-stiffness area) was not formed in the composite structure in the related art, it is substantially preferable that the area of Zone A not be excessively increased. However, when the width d of Zone A is set to be larger than the minor diameter a of the hole, there is an advantage that a fiber sheet of Zone A used at the time of manufacturing can be formed of one sheet.

From the above description, in order to obtain the maximum effect, it is preferable that the width d of Zone A be set to 1.1 times or less of the minor diameter a of the hole. According to FIG. 10, when the width of Zone A is set in the range of 0.81 times to 1.0 time of the minor diameter a of the hole, it is possible to obtain actual strength that is equal, to or higher than strength in a case in which the width of Zone A is set to be larger than the minor diameter a of the hole.

SECOND EXAMPLE

The width d of the optimum peripheral area of a composite structure having the following configuration was set.

The composite structure is made of CFRP including holes (thickness t: 6.1 mm, and width w: 400 mm), and includes peripheral areas (Zones A) and the other area (Zone B).

The peripheral area (Zone A) had a laminate structure in which a 0°-layer occupies 12.5% of the entirety and a 45°-layer occupies 75% of the entirety, and an elastic modulus of the peripheral area in the direction of 0° was 35 GPa.

The other area (Zone B) had a laminate structure in which a 0°-layer occupies 37.5% of the entirety and a 45°-layer occupies 50% of the entirety, and an elastic modulus of the other area in the direction of 0° was 63 GPa.

Holes, which are formed at the composite structure, were formed in the shape of a circle having a diameter a.

The disposition of Zone A with respect to the hole and the width d of Zone A are shown in FIGS. 11 and 12. The width d of Zone A (a ratio relative to the diameter a of the hole) was set to 0 mm, 16.25 mm (0.27 times), 32.50 mm (0.54 times), 48.75 mm (0.81 times), 60.00 mm (1.00 time), 65.00 mm (1.08 times), 70.00 mm (1.17 times), 80.00 mm (1.33 times), 90.00 mm (1.50 times), and 100 mm (1.76 times).

Allowable Strain and Allowable Strain Ratio

The allowable strain and the allowable strain ratios of Zone A and Zone B referred to the results of the first example.

Strain Concentration Rate and Strain Concentration Ratio

A strain concentration rate at the width d of each Zone A, when tension was applied in the direction of 0°, was calculated by a finite element method (FEM) analysis.

Strain concentration rates, when the width d of Zone A was changed (width d: 0 mm, 16.25 mm, 32.50 mm, 48.75 mm, 60.00 mm, 65.00 mm, 70.00 mm, 80.00 mm, 90.00 mm, and 100 mm), were 3.1, 3.0, 2.8, 2.6, 2.4, 2.3, 2.4, 2.5, 2.5, and 2.5, respectively.

Strain concentration ratios were calculated on the basis of the results. The strain concentration ratio is a value that is obtained with reference to the strain concentration rate obtained when the width of Zone A is 0 mm, that is, when Zone A is not formed. The strain concentration ratios were 1.0, 1.0, 0.9, 0.8, 0.8, 0.7, 0.8, 0.8, 0.8, and 0.8, respectively.

Strength Ratio

Figure 13:
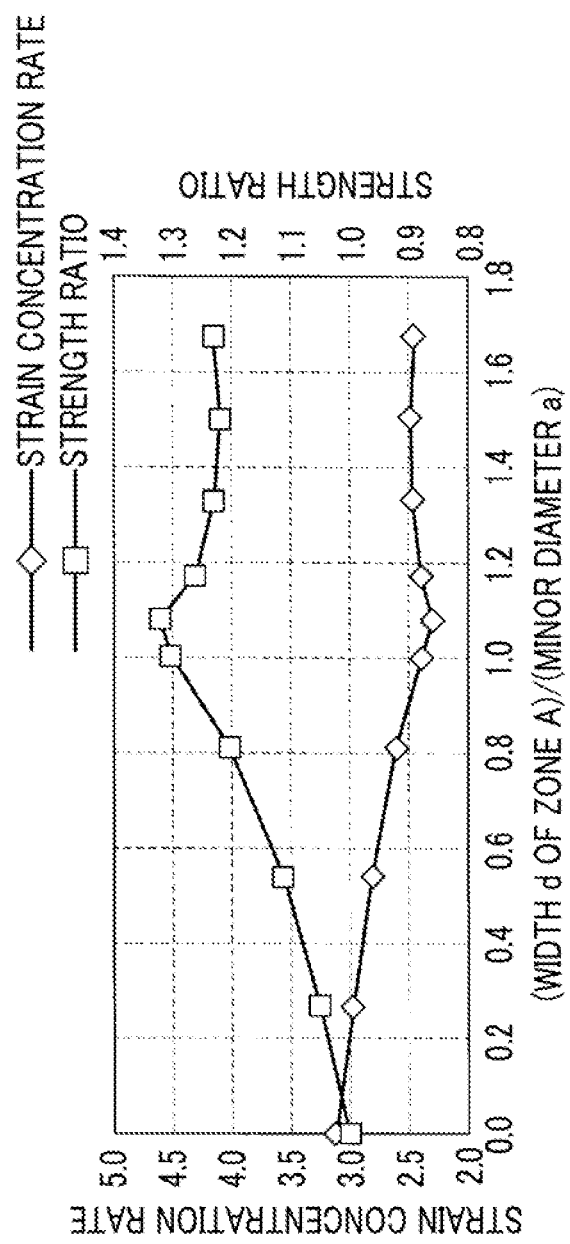
FIG. 13 is a graph showing a relationship between the width of Zone A of the second example and a strain concentration rate and a relationship between the width of Zone A and a strength ratio.

A strength ratio (=allowable strain ratio/strain concentration ratio) was calculated from an allowable strain ratio and a strain concentration ratio. FIG. 13 is a graph showing a relationship between the width of Zone A and a strain concentration rate, and a relationship between the width of Zone A and a strength ratio. In FIG. 13, a horizontal axis represents a ratio of the width d of the peripheral area A to the diameter a, and vertical axes represent a strain concentration rate and a strength ratio.

According to FIG. 13, a strain concentration rate was the lowest when the width of Zone A was 1.08 times of the diameter a of the hole. Accordingly, it was confirmed that an effect of reducing the strain concentration rate of the peripheral portion of the hole was obtained by setting the width d of Zone A to 0.54 times or more of the diameter a of the hole.

A strength ratio in the case in which Zone A is formed is higher than a strength ratio in the case in which Zone A is not formed. Accordingly, when the width of Zone A is set to 0.54 times or more of the diameter a of the hole, the effect becomes significant. When the width of Zone A was 1.08 times of the diameter a of the hole, the effect becomes maximum. In the examination, the increase of a strength ratio, which occurs when the width d of Zone A is set to 1.0 time or less of the diameter a of the hole, is caused by the fact that an area, which is adjacent to a portion where the diameter a of the hole intersects with the periphery of the hole, (a portion that is likely to be fractured) becomes the other area and the allowable strain ratio of a portion, which is likely to be fractured, is increased.

When the width d of Zone A having low stiffness is increased, the stiffness of the entire composite structure is reduced. Accordingly, it is preferable that the width d of Zone A be as small as possible to obtain an effect of reducing a strain concentration rate to the maximum and to prevent the deterioration of the function of the composite structure. Further, since Zone A (low-stiffness area) was not formed in the composite structure in the related art, it is substantially preferable that the area of Zone A not be excessively increased. However, when the width d of Zone A is set to be larger than the diameter a of the hole, there is an advantage that a fiber sheet of Zone A used at the time of manufacturing can be formed of one sheet.

From the above description, in order to obtain the maximum effect, it is preferable that the width d of Zone A be set to 1.1 times or less of the diameter a of the hole. According to FIG. 10, when the width of Zone A is set in the range of 0.81 times to 1.0 time of the diameter a of the hole, it is possible to obtain actual strength that is equal to or higher than strength in a case in which the width of Zone A is set to be larger than the diameter a of the hole.

REFERENCE SIGNS LIST

1: main wing
3: lower outer plate (composite structure)
3a: peripheral area
3b: the other area
5: access hole (hole)

The invention claimed is:

1. A composite structure, comprising:
a holed structural member that is a composite material made of fiber reinforced plastic, the holed structural member extending in one direction,
wherein holes are formed in the holed structural member, the holes being arranged along an axial line extending in the one direction,
wherein the holed structural member is composed of a peripheral area that is positioned around the holes and an other area that surrounds the peripheral area,
wherein the holed structural member is formed of an integrated composite member which is not divided and which includes oriented carbon fiber reinforced plastic as a main component,
wherein a ratio of an orientation of carbon fiber of the peripheral area is different from a ratio of an orientation of carbon fiber of the other area,
wherein the holed structural member has a first lateral side extending in a direction in which the composite structure is shortest and a second lateral side extending in the direction in which the composite structure is shortest,
wherein a length of the peripheral area extends from the first lateral side of the holed structural member to the second lateral side of the holed structural member,
wherein a centerline of the peripheral area extends along the axial line extending in the one direction,
wherein the peripheral area adjoins at least a portion of a perimeter of each of the holes,
wherein the holed structural member is configured to receive a tensile load and/or a compressive load applied to the composite structure in the one direction,
wherein tensile stiffness and/or compression stiffness of the peripheral area of the holes in the one direction is lower than tensile stiffness and/or compression stiffness of the other area in the one direction, wherein a width of the peripheral area in a direction orthogonal to the one direction is set to a range of 0.54 to 1.0 times a diameter of one of the holes in the direction orthogonal to the one direction, and wherein the holes are access holes that are formed at a lower outer plate of a wing of an aircraft.

2. The composite structure according to claim 1, peripheral area, the carbon fiber is oriented in a direction of ±30° to ±60° in a state in which the one direction is 0°.

3. The composite structure according to claim 1, wherein, in the peripheral area, the carbon fiber is oriented in a direction of ±45° in a state in which the one direction is 0°.

4. An aircraft wing comprising:
the composite structure according to claim 1.

5. A composite structure, comprising:
a holed structural member that is a composite material made of fiber reinforced plastic, the holed structural member extending in one direction, wherein holes are formed in the holed structural member, the holes being arranged along an axial line extending in the one direction, wherein the holed structural member is composed of a peripheral area that is positioned around the holes and an other area that surrounds the peripheral area, wherein the holed structural member is formed of an integrated composite member which is not divided and which includes oriented carbon fiber reinforced plastic as a main component, wherein a ratio of an orientation of the carbon fiber of the peripheral area is different from a ratio of an orientation of the carbon fiber of the other area, wherein the holed structural member has a first lateral side extending in a direction in which the composite structure is shortest and a second lateral side extending in the direction in which the composite structure is shortest, wherein a length of the peripheral area extends from the first lateral side of the holed structural member to the second lateral side of the holed structural member, wherein a centerline of the peripheral area extends along the axial line extending in the one direction, wherein the peripheral area adjoins at least a portion of a perimeter of each of the holes, wherein the holed structural member is configured to receive a tensile load and/or a compressive load applied to the composite structure in the one direction, wherein tensile stiffness and/or compression stiffness of the peripheral area of the holes in the one direction is lower than tensile stiffness and/or compression stiffness of the other area in the one direction, wherein a width of the peripheral area in a direction orthogonal to the one direction is set to a range of 0.54 to 1.0 times a diameter of one of the holes in the direction orthogonal to the one direction, and wherein the holes are window holes that are formed at an outer plate of a fuselage of an aircraft.

6. The composite structure according to claim 5, wherein, in the peripheral area, the carbon fiber is oriented in a direction of ±30° to ±60° in a state in which the one direction is 0°.

7. The composite structure according to claim 5, wherein, in the peripheral area, the carbon fiber is oriented in a direction of ±45° in a state in which the one direction is 0°.

8. An aircraft fuselage comprising:
the composite structure according to claim 5.

* * * * *